US011186066B2

(12) United States Patent
Hemphill et al.

(10) Patent No.: US 11,186,066 B2
(45) Date of Patent: Nov. 30, 2021

(54) GYPSUM BOARD FROM GYPSUM HAVING HIGH LEVEL OF CHLORIDE SALT AND A PERFORATED SHEET AND METHODS ASSOCIATED THEREWITH

(71) Applicant: UNITED STATES GYPSUM COMPANY, Chicago, IL (US)

(72) Inventors: Mark Hemphill, Hawthorn Woods, IL (US); Qinghua Li, Rolling Meadows, IL (US); Charles W. Cochran, Elkhorn, WI (US)

(73) Assignee: UNITED STATES GYPSUM COMPANY, Chicago, IL (US)

(*) Notice: Subject to any disclaimer, the term of this patent is extended or adjusted under 35 U.S.C. 154(b) by 55 days.

(21) Appl. No.: 16/401,675

(22) Filed: May 2, 2019

(65) Prior Publication Data
US 2020/0055277 A1 Feb. 20, 2020

Related U.S. Application Data

(60) Provisional application No. 62/718,647, filed on Aug. 14, 2018.

(51) Int. Cl.
*B32B 13/08* (2006.01)
*B32B 29/06* (2006.01)
(Continued)

(52) U.S. Cl.
CPC ............... *B32B 13/08* (2013.01); *B32B 3/26* (2013.01); *B32B 29/002* (2013.01); *B32B 29/06* (2013.01);
(Continued)

(58) Field of Classification Search
CPC ......... B32B 13/08; B32B 3/26; B32B 29/002; B32B 29/06; B32B 2607/00; C04B 28/142; C04B 2111/0062; Y10T 428/249968
See application file for complete search history.

(56) References Cited

U.S. PATENT DOCUMENTS 649,363 A   5/1900  Ryan
654,024 A   7/1900  Ryan
(Continued)

FOREIGN PATENT DOCUMENTS

CN   105587084 A    5/2016
EP     1112986 A1   7/2001
(Continued)

OTHER PUBLICATIONS

Machine Translation of JP 2005-146651 (Year: 2005).*
(Continued)

*Primary Examiner* — Humera N. Sheikh
*Assistant Examiner* — John D Schneible
(74) *Attorney, Agent, or Firm* — Vorys, Sater Seymour and Pease LLP; Pradip Sahu; Philip T. Petti (57) ABSTRACT

Gypsum boards formed from synthetic gypsum and other gypsum sources having high chloride salt concentrations. The gypsum boards may include a set gypsum board core layer between a front and back paper cover sheets. The back paper cover sheet has a plurality of perforations extending therethrough. Methods of making the gypsum boards, and a wall system for employing the gypsum boards, are also provided. The concentration of the chloride anion in aqueous gypsum slurry used to make the set gypsum board core layer and to perform the methods of the invention may range from about 500 ppm to about 3000 ppm, typically from about 500 ppm to about 2000 ppm per 1,000,000 parts by weight (Continued)

calcium sulfate hemihydrate, more typically from about 500 ppm to about 1500 ppm per 1,000,000 parts by weight calcium sulfate hemihydrate.

19 Claims, 6 Drawing Sheets (51) Int. Cl.
  B32B 29/00   (2006.01)
  C04B 28/14   (2006.01)
  B32B 3/26    (2006.01)
  C04B 111/00  (2006.01)

(52) U.S. Cl.
  CPC ........ *C04B 28/142* (2013.01); *B32B 2607/00* (2013.01); *C04B 2111/0062* (2013.01); *Y10T 428/249968* (2015.04)

(56) References Cited

U.S. PATENT DOCUMENTS

| | | |
|---|---|---|
| 1,190,431 A | 7/1916 | Linkletter et al. |
| 1,439,954 A | 12/1922 | Emerson |
| 1,568,314 A | 1/1926 | Buttress et al. |
| 1,890,674 A | 12/1932 | Delaney |
| 2,078,199 A | 4/1937 | King |
| 2,239,107 A | 4/1941 | Lefebure |
| 2,879,662 A | 3/1959 | Spinelli |
| 3,382,636 A | 5/1968 | Green |
| 3,516,882 A | 6/1970 | Cummisford |
| 3,573,947 A | 4/1971 | Kinkade |
| 4,051,291 A | 9/1977 | Long |
| 4,117,183 A | 9/1978 | Long |
| 4,327,146 A | 4/1982 | White |
| 4,544,424 A | 10/1985 | Take et al. |
| 5,256,222 A | 10/1993 | Shepherd et al. |
| 5,643,510 A | 7/1997 | Sucech |
| 5,683,635 A | 11/1997 | Sucech et al. |
| 5,798,425 A | 8/1998 | Albrecht et al. |
| 6,342,284 B1 | 1/2002 | Yu et al. |
| 6,409,825 B1 | 6/2002 | Yu et al. |
| 6,494,609 B1 | 12/2002 | Wittbold et al. |
| 6,632,550 B1 | 10/2003 | Yu et al. |
| 6,694,695 B2 | 2/2004 | Collins et al. |
| 6,777,517 B1 | 8/2004 | Albrecht et al. |
| 6,815,049 B2 | 11/2004 | Veeramasuneni et al. |
| 6,822,033 B2 | 11/2004 | Yu et al. |
| 6,874,930 B2 | 4/2005 | Wittbold et al. |
| 7,244,304 B2 | 7/2007 | Yu et al. |
| 7,364,676 B2 | 4/2008 | Sucech et al. |
| 7,731,794 B2 | 6/2010 | Yu et al. |
| 7,892,472 B2 | 2/2011 | Veeramasuneni et al. |
| 8,133,600 B2 | 3/2012 | Wang et al. |
| 8,257,489 B2 | 9/2012 | Yu et al. |
| 8,262,820 B2 | 9/2012 | Yu et al. |
| 8,303,159 B2 | 11/2012 | Yu et al. |
| 8,398,764 B2 | 3/2013 | Mahoney et al. |
| 8,470,461 B2 | 6/2013 | Yu et al. |
| 9,945,119 B2 | 4/2018 | Aldabaibeh et al. |
| 10,427,979 B2 | 10/2019 | Harrison et al. |
| 2005/0067082 A1 | 3/2005 | Mowry |
| 2006/0035112 A1* | 2/2006 | Veeramasuneni et al. ................. B29C 67/24 428/703 |
| 2007/0023118 A1 | 2/2007 | Spielvogel |
| 2007/0102237 A1 | 5/2007 | Baig |
| 2007/0141304 A1 | 6/2007 | Agrawal |
| 2007/0148430 A1 | 6/2007 | Agrawal |
| 2007/0149078 A1 | 6/2007 | Nandi et al. |
| 2007/0255032 A1 | 11/2007 | Bichler et al. |
| 2010/0247937 A1 | 9/2010 | Liu et al. |
| 2012/0168527 A1 | 7/2012 | Li et al. |
| 2012/0170403 A1 | 7/2012 | Li et al. |
| 2014/0000979 A1* | 1/2014 | Dugan et al. ......... E04B 1/8409 181/290 |
| 2014/0113124 A1 | 4/2014 | Sang et al. |
| 2014/0113128 A1 | 4/2014 | Sang et al. |
| 2015/0010767 A1 | 1/2015 | Sang et al. |
| 2015/0306846 A1 | 10/2015 | Xu et al. |
| 2016/0258157 A1 | 9/2016 | Yu et al. |
| 2016/0375655 A1 | 12/2016 | Li et al. |
| 2017/0166792 A1 | 6/2017 | Ayambem |
| 2017/0183868 A1 | 6/2017 | Yu et al. |
| 2017/0246838 A1 | 8/2017 | Rohlf |
| 2018/0065336 A1 | 3/2018 | Shubert et al. |
| 2018/0066400 A1 | 3/2018 | Waldron et al. |

FOREIGN PATENT DOCUMENTS

| | | |
|---|---|---|
| EP | 1114005 A1 | 7/2001 |
| GB | 490667 A | 8/1938 |
| GB | 516484 A | 1/1940 |
| GB | 879392 A | 10/1961 |
| GB | 1381457 A | 1/1975 |
| GB | 1573871 A | 8/1980 |
| WO | 9957371 A1 | 11/1999 |
| WO | 0006518 A | 2/2000 |
| WO | 2008049473 A2 | 5/2008 |

OTHER PUBLICATIONS

Debra F. Pflughoeft-Hassett et al., A Comparison of Properties of FGD & Natural Gypsum Products, Agricultural & Industrial Uses of FGD Gypsum Workshop, EERC, Oct. 23, 2007, Atlanta, Georgia.

Office Action dated Dec. 10, 2020 from U.S. Appl. No. 16/401,719 to United States Gypsum Company.

* cited by examiner

Effect of perforation on 12 inch x 12 inch x 1/2 inch board containing 600 ppm Cl⁻ from NaCl

FIG. 6

Effect of perforation on 12 inch x 12 inch x 1/2 inch board containing 800 ppm Cl⁻ from NaCl

FIG. 7

Effect of perforation on 12 inch x 12 inch x 1/2 inch board containing 800 ppm Cl⁻ from $CaCl_2$

FIG. 8

Effect of perforation on 12 inch x 12 inch x 1/2 inch board containing 800 ppm Cl⁻ from $MgCl_2$

FIG. 9

GYPSUM BOARD FROM GYPSUM HAVING HIGH LEVEL OF CHLORIDE SALT AND A PERFORATED SHEET AND METHODS ASSOCIATED THEREWITH

CROSS-REFERENCE TO RELATED APPLICATIONS

This claims the benefit of U.S. provisional patent application No. 62/718,647, filed Aug. 14, 2018, incorporated herein by reference.

FIELD OF THE INVENTION

The present invention relates to gypsum board formed from synthetic gypsum and other gypsum sources having high chloride salt concentrations. The present invention also provides a method of preparing the gypsum board with at least a perforated back cover sheet to improve adhesion of a board core layer (gypsum core) to the back cover sheet relative to a gypsum board without a perforated back cover sheet, and a wall system for employing the gypsum board.

BACKGROUND OF THE INVENTION

In the construction of buildings, one of the more common building elements for construction and remodeling is gypsum wallboard, often known as drywall, gypsum boards, gypsum panels, gypsum paneling, and ceiling tiles. In chemical terms, gypsum is calcium sulfate dihydrate ($CaSO_4 \cdot 2H_2O$).

Set gypsum (calcium sulfate dihydrate) is a well-known material that is used in such products. Panels containing set gypsum are often referred to as gypsum boards, which contain a board core layer (set gypsum core) sandwiched between two cover sheets, particularly paper cover sheets. Such panels are commonly used in drywall construction of the interior walls and ceilings of buildings. One or more denser regions, often referred to as "skim coats," may be included as layers on either face of the board core layer, usually at an interface (bond surface) between the board core layer and an inner surface of a cover sheet. The denser regions may be contiguous with a less dense region of the gypsum core following setting of the gypsum.

During manufacture of a gypsum board, stucco (containing calcium sulfate hemihydrate), water, and other ingredients as appropriate may be mixed, typically in a mixer to form an aqueous gypsum slurry. The terms of art aqueous gypsum slurry or aqueous slurry or gypsum slurry are typically employed for the slurry both before and after the calcium sulfate hemihydrate converts to calcium sulfate dihydrate. The gypsum slurry is formed and discharged from the mixer onto a moving conveyor carrying a first cover sheet, optionally bearing a skim coat. If present, the skim coat is applied upstream from the location where the gypsum slurry is discharged onto the first cover sheet. After applying the gypsum slurry to the first cover sheet, a second cover sheet, again optionally bearing a skim coat, is applied onto the gypsum slurry to form a sandwich assembly having a desired thickness. A forming plate, roller or the like may aid in setting the desired thickness. The gypsum slurry is then allowed to harden by forming set (i.e., rehydrated) gypsum through a reaction between the calcined gypsum and water to form a matrix of crystalline hydrated gypsum (i.e., calcium sulfate dihydrate, also known as set gypsum). The desired hydration of the calcined gypsum promotes formation of an interlocking matrix of set gypsum crystals, thereby imparting strength to the gypsum board. Heat may be applied (e.g., using a kiln) to drive off the remaining free (i.e., unreacted) water to yield a dry product. Then the set gypsum product is cut to form gypsum boards of desired length.

Gypsum (calcium sulfate dihydrate and any impurities) suitable for use in wallboard may be obtained from both natural and synthetic sources, followed by further processing.

Natural gypsum may be used by calcining its calcium sulfate dihydrate to produce the hemihydrate form. Gypsum from natural sources is a naturally occurring mineral and can be mined in rock form. Naturally occurring Gypsum is a mineral that is typically found in old salt-lake beds, volcanic deposits, and clay beds. When it is mined, raw gypsum is generally found in the dihydrate form Gypsum is also known as calcium sulfate dihydrate, terra alba or landplaster. This material is also produced as a by-product in various industrial processes. For example, synthetic gypsum is a byproduct of flue gas desulfurization processes from power plants. In gypsum, there are approximately two water molecules of water associated with each molecule of calcium sulfate.

Plaster of Paris is also known as calcined gypsum, stucco, calcium sulfate semihydrate, calcium sulfate half-hydrate or calcium sulfate hemihydrate.

When calcium sulfate dihydrate from either source is heated sufficiently, in a process called calcining or calcination, the water of hydration is at least partially driven off and there can be formed either calcium sulfate hemihydrate ($CaSO_4 \cdot \frac{1}{2}H_2O$) (typically provided in the material commonly referred to as "stucco") or calcium sulfate anhydrite ($CaSO_4$) depending on the temperature and duration of exposure. As used herein, the terms "stucco" and "calcined gypsum" refer to both the hemihydrate and anhydrite forms of calcium sulfate that may be contained therein. Calcination of the gypsum to produce the hemihydrate form takes place by the following equation:

$$CaSO_4 \cdot 2H_2O \rightarrow CaSO_4 \cdot 0.5H_2O + 1.5H_2O$$

Calcined gypsum is capable of reacting with water to form calcium sulfate dihydrate, which is a rigid product and is referred to herein as "set gypsum."

Gypsum may also be obtained synthetically (referred to as "syngyp" in the art) as a by-product of industrial processes such as flue gas desulfurization from power plants, for example. Natural or synthetic gypsum can be calcined at high temperatures, typically above 150° C., to form stucco (i.e., calcined gypsum in the form of calcium sulfate hemihydrate and/or calcium sulfate anhydrite), which may undergo subsequent rehydration to form set gypsum in a desired shape, such as a board.

Synthetic gypsum obtained from power plants is usually suitable for use in gypsum panels intended for construction projects. Synthetic gypsum is a byproduct of flue gas desulfurization processes from power plants (also known as desulphurisation gypsum or desulphogyspum or DSG). In particular, flue gas including sulfur dioxide is wet scrubbed with lime or limestone, which produces calcium sulfite in the following reaction.

$$CaCO_3 + SO_2 \rightarrow CaSO_3 + CO_2$$

The calcium sulfite is then converted to calcium sulfate in the following reaction.

$$CaSO_3 + 2H_2O + \frac{1}{2}O_2 \rightarrow CaSO_4 \cdot 2H_2O$$

The hemihydrate form may then be produced by calcination in a similar manner to that used for natural gypsum.

However, many conventional coal-fired power plants are being shut down in favor of more environmentally friendly sources of energy. The shutdown of coal-fired power plants has created a growing shortage of synthetic gypsum suitable for producing gypsum panels. Lower quality synthetic gypsum is available from power plants and other sources, but this alternatively sourced gypsum often contains fairly high concentrations of extraneous salts, particularly magnesium or sodium salts, more particularly magnesium chloride and sodium chloride. Small amounts of potassium chloride and calcium chloride may also be present in alternatively sourced synthetic gypsum. The extraneous salts can be problematic due to their tendency to decrease adhesion between the board core and the cover sheets, particularly a back paper cover sheet.

It will be appreciated that this background description has been created by the inventors to aid the reader, and is neither a reference to prior art nor an indication that any of the indicated problems were themselves appreciated in the art. While the described principles can, in some regards and embodiments, alleviate the problems inherent in other systems, it will be appreciated that the scope of the protected innovation is defined by the attached claims, and not by the ability of the claimed invention to solve any specific problem noted herein.

BRIEF SUMMARY OF THE INVENTION

The invention relates to gypsum boards having significant adhesion between the board core layer and one or more of the cover sheets, particularly a back paper cover sheet, even when appreciable quantities of extraneous salts are present, particularly chloride salts, and more particularly NaCl, KCl, $MgCl_2$ and/or $CaCl_2$). Methods for producing the gypsum boards from salt-containing gypsum sources, particularly low-quality synthetic gypsum, are provided. Improved adhesion between the board core layer and the back cover sheet may be realized by introducing a plurality of perforations in the back cover sheet, particularly a back paper cover sheet.

Thus, in one aspect, the invention provides gypsum boards comprising a board core layer comprising set gypsum and one or more chloride salts selected from the group consisting of NaCl, KCl, $MgCl_2$, $CaCl_2$), and any combination thereof.

In particular, the invention provides a gypsum board comprising:
  a board core layer comprising set gypsum;
  a front paper cover sheet having an outer surface and an inner surface, the inner surface contacting a first face of the board core layer; and
  a back paper cover sheet having an outer surface and an inner surface, the inner surface contacting a second face of the board core layer;
  wherein the board core layer is disposed between the front paper cover sheet and the back paper cover sheet, and the back paper cover sheet comprises a plurality of perforations extending therethrough; and
  wherein the board core layer resulted from setting of an aqueous slurry comprising water and stucco between the first cover sheet and the second cover sheet, wherein the stucco comprises calcium sulfate hemihydrate and the one or more chloride salts, and the aqueous slurry comprises:
    at least 60 weight percent said calcium sulfate hemihydrate on a dry (water free) basis,
    about 500 ppm to about 3000 ppm chloride anion per 1,000,000 parts by weight of said calcium sulfate hemihydrate, and
    the water at a weight ratio of water to the calcium sulfate hemihydrate of 0.2:1 to 1.2:1.

The inner surface of a front paper cover sheet having an outer surface and an inner surface contacts a first face of the board core layer. The inner surface of a back paper cover sheet having an outer surface and an inner surface also contacts a second face of the board core layer. The back paper cover sheet has a plurality of perforations extending therethrough. More particularly, the outer surface of the back paper cover sheet may be attached to a wall once the gypsum board has been installed, and the outer surface of the front cover sheet may face outwardly from the wall once the gypsum board has been installed. One or both of the cover sheets may comprise a paper cover sheet, which may be the same or different paper materials.

The calcium sulfate hemihydrate is present in the deposited aqueous slurry of the invention in amounts of at least 60 wt. % of the dry (water-free) materials of the aqueous slurry. Preferably the calcium sulfate hemihydrate is at least 70 wt. % of the dry (water-free) materials of the aqueous slurry, more preferably at least 80 wt. % of the dry (water-free) materials of the aqueous slurry. In typical wallboard formulations of the invention the dry (water-free) materials of the aqueous slurry have at least 90 wt. % or at least 95 wt. % calcium sulfate hemihydrate. Use of calcium sulfate anhydrite is also contemplated, although it is preferably used in small amounts of less than 20 wt. % of the dry (water-free) materials of the aqueous slurry.

Likewise, calcium sulfate dihydrate is present in the board core layer of the gypsum board of the invention resulting from setting the aqueous slurry is at least 60 wt. % of the core, preferably at least 70 wt. %, and more preferably at least 80 wt. %. In typical wallboard formulations the dry (water-free) materials of the aqueous slurry have at least 90 wt. % or at least 95 wt. % calcium sulfate dihydrate.

In one or more other aspects of the invention, the invention provides methods for preparing a gypsum board having significant quantities of one or more extraneous salts in a board core layer. The gypsum boards may exhibit significant adhesion between the board core layer and the back cover sheet, even when the one or more extraneous salts are present. The methods prepare the gypsum board with a back cover sheet having a plurality of perforations extending therethrough to improve adhesion of the board core layer to the back cover sheet relative to a gypsum board lacking cover sheet perforation.

The methods of the invention comprise:
  preparing an aqueous slurry comprising a mixture of water and stucco, wherein the stucco comprises calcium sulfate hemihydrate, and any combination thereof, and the aqueous slurry comprises a mixture of:
    at least 60 weight percent said calcium sulfate hemihydrate on a dry basis, about 500 ppm to about 3000 ppm chloride anions per 1,000,000 parts by weight (pbw) said calcium sulfate hemihydrate, and
    the water at a weight ratio of water to the calcium sulfate hemihydrate of 0.2:1 to 1.2:1; and
  disposing the aqueous slurry between a front paper cover sheet and a back paper cover sheet, each paper cover sheet having an inner surface and an outer surface, and the aqueous slurry contacts the inner surfaces of the front cover sheet and the back cover sheet;
  wherein the back paper cover sheet comprises a plurality of perforations extending therethrough;
  setting the calcium sulfate hemihydrate to form a panel comprising a board core layer comprising calcium sulfate dihydrate; and drying the panel and cutting the panel into a gypsum board having one or more pre-determined dimensions.

About 500 ppm to about 3000 ppm chloride anions per 1,000,000 parts by weight said calcium sulfate hemihydrate means that for 1,000,000 parts by weight said calcium sulfate hemihydrate the amount of chloride anions present is about 500 ppm to about 3000 ppm.

The concentration of the chloride anion in the aqueous slurry used to make gypsum board products of the invention and to perform methods of the invention may range from about 500 ppm to about 3000 ppm, typically from about 500 ppm to about 2000 ppm per 1,000,000 parts by weight calcium sulfate hemihydrate, more typically from about 500 ppm to about 1500 ppm per 1,000,000 parts by weight calcium sulfate hemihydrate.

The chloride anion in the aqueous slurry used for products and methods of the invention may arise from any source. Generally, the one or more chloride salts are present in the gypsum source used to form the board core of the invention. The gypsum source may be a synthetic gypsum source, particularly a low-quality synthetic gypsum obtained from a power plant flue gas stream. Thus, generally the source of the chloride anion is the one or more chloride salts in the stucco used to make the aqueous slurry. The chloride anions are derived from the chloride atoms of the one or more chloride salts in the stucco when the stucco is used in the aqueous slurries. Typically, the one or more chloride salts are any of NaCl, KCl, $MgCl_2$, $CaCl_2$), or any combination thereof. However, the chloride anions may also arise from impurities, such as one or more chloride salts, in water used to make the gypsum slurry Typically, the aqueous gypsum slurry has less than 10 wt. %, more typically an absence, of Portland cement or other hydraulic cement on a dry (water-free) basis. Typically, the aqueous gypsum slurry has less than 10 wt. %, more typically an absence, of fly ash on a dry (water-free) basis. Typically, the aqueous gypsum slurry has less than 10 wt. %, more typically an absence, of calcium carbonate on a dry (water-free) basis.

For purposes of this disclosure a dry basis is a water-free basis.

All average molecular weights, percentages and ratios used herein, are by weight (i.e., wt. %) unless otherwise indicated.

In one or more other aspects of the invention, the invention provides a wall system comprising framing to which is attached at least one gypsum board of the invention, wherein the outer surface of the front cover sheet faces away from the framing. In the wall system, the gypsum board may be on an interior wall or ceiling of a building. Typically, the framing is wood or metal. Typically, the at least one gypsum board is attached to the framing by any one or more of screws, nails, glue, or other mechanical fasteners.

Advantages of the present invention may become apparent to those having ordinary skill in the art from a review of the following detailed description, taken in conjunction with the examples, and the appended claims. It should be noted, however, that while the invention is susceptible of various forms, the present disclosure is intended as illustrative, and is not intended to limit the invention.

DETAILED DESCRIPTION OF THE INVENTION

The present invention provides the ability to use gypsum containing relatively high amounts of extraneous salts in the board core layer of a gypsum board. Under ordinary circumstances, high salt concentrations in the board core layer may result in insufficient adhesion between the board core layer and at least one of the front cover sheet and the back cover sheet, particularly the back cover sheet.

Surprisingly, perforation of the back cover sheet of a gypsum board may improve its adhesion to a board core layer containing high amounts of extraneous salts. The board core layer may be made from an aqueous slurry of stucco containing calcium sulfate hemihydrate and high amounts of extraneous salts, particularly chloride salts. One or both of the cover sheets may be paper cover sheets, which may be the same or different paper materials. Optionally, the front cover sheet of a gypsum board may be perforated as well, with similar advantages being possible. Further optionally, various additives may be present in the board core layer or a gypsum slurry used to form the board core layer. The board core layer may further comprise one or more high-density regions (layers) in contact with the inner surface of the front cover sheet or the back cover sheet and coated thereon. The one or more high-density regions may be in contact with a low-density interior of the board core layer.

Without being bound by any theory or mechanism, it is believed that the perforations within the back cover sheet, provide a conduit for outward migration of chloride salts released from the board core layer that would otherwise detrimentally aggregate at the interface between the board core layer and the cover sheets. Instead, when the perforations are present, the chloride ions and their counter ion (i.e., $Na^+$, $K^+$, $Mg^{2+}$ and/or $Ca^{2+}$) may migrate at least partially through the perforations and potentially leave the gypsum board environment. Alternately, the salts may precipitate within or just outside the perforations on the outer surface of the back cover sheet. Due to the salt precipitate the outside of perforations, the "net salt" between paper and core is reduced, therefore, less salt is present the interface, resulting in a good paper-to-core bond. In either case, improved adhesion between the board core layer and the cover sheet may result.

When the back cover sheet of a gypsum board is perforated in the manner described herein, the gypsum boards may benefit from improved adhesion between the board core layer and the cover sheet(s), relative to a gypsum board which is the same but for lacking perforation of the cover sheet(s). Accordingly, the present invention provides gypsum boards containing significant quantities of extraneous salts in a board core layer and methods for producing such gypsum boards using a gypsum source containing significant quantities of the extraneous salts. Thus, perforation of at least one of the cover sheets of a gypsum board with a plurality of perforations, particularly the back cover sheet, may allow lower quality gypsum sources containing excessive extraneous salts, particularly chloride salts, to be used in forming the gypsum board. Such gypsum sources may otherwise be unsuitable for forming a gypsum board with sufficient adhesion between the board core layer and the cover sheets. Advantageously, the present invention addresses this issue.

Gypsum Board

Figure 1:
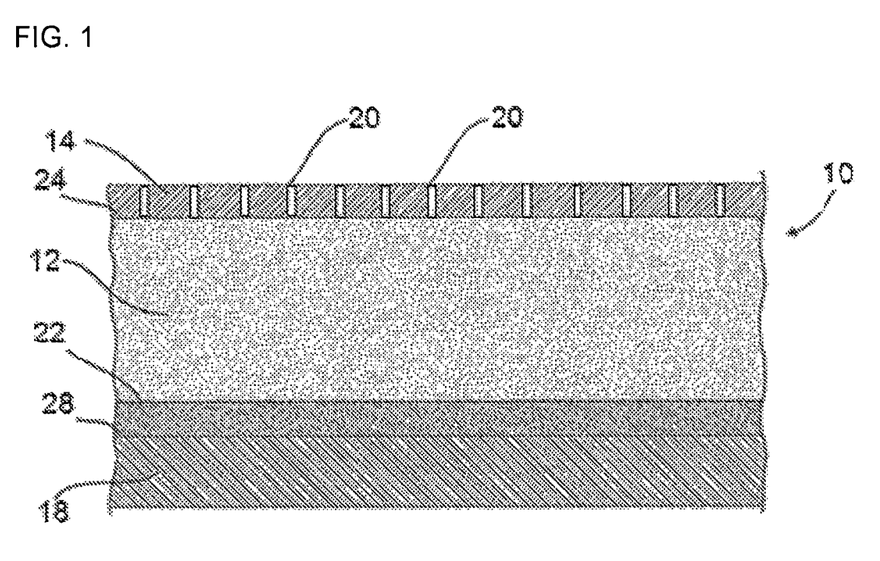
FIG. 1 shows a cross-sectional view of a gypsum board of the invention, in which a board core layer (gypsum core) is sandwiched between a front cover sheet and a back cover sheet, with the back cover sheet comprising a plurality of perforations extending therethrough.

FIG. 1 depicts a cross-sectional view of the wallboard panel (gypsum board) 10 of the invention in which a gypsum core (board core layer) 12 (for example 0.5 inch thick) is sandwiched between a backer paper cover sheet (back cover sheet) 14 and a facer paper cover sheet (front cover sheet) 18, which may each be single-ply or multi-ply paper. The backer paper cover sheet (back cover sheet) 14 has perforations 20. The inner surface of the backer paper cover sheet 14 creates a bond side 24 of the backer paper cover sheet 14 which faces the gypsum core 12. The inner surface of the facer paper cover sheet 18 creates a bond side 28 which faces the gypsum core 12. The outer surface of the backer paper cover sheet 14 faces wall framing (see FIG. 3) of a room after the wallboard panel 10 is installed as an interior wall. The outer surface of the facer paper cover sheet 18 faces inside of a room after the wallboard panel 10 is installed as an interior wall.

Figure 2:
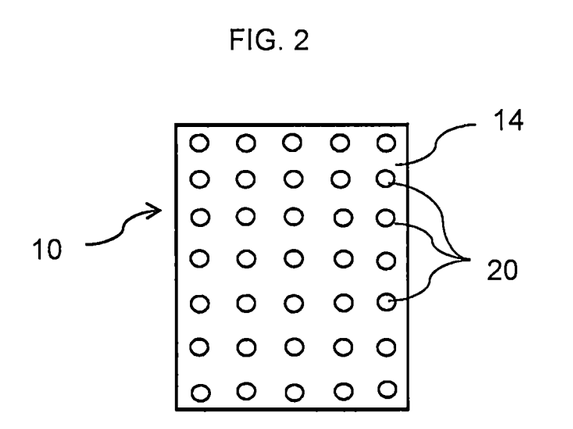
FIG. 2 shows a top (axial) view of the gypsum board of FIG. 1, in which the arrangement of the plurality of perforations in the back cover sheet can be better seen.

Backer paper cover sheet (back cover sheet) 14 contains a plurality of perforations 20 extending therethrough according to the present invention. FIG. 2 shows a top (axial) view of the wallboard panel 10, in which an illustrative configuration of perforations 20 may be seen within backer paper cover sheet 14. As depicted, the perforations 20 are patterned in a regular array of columns and rows. It is to be appreciated that other patterned arrangements of perforations 20 also reside within the scope of the invention, and the depicted number, spacing and coverage density of the perforations 20 should not be considered limiting.

The perforations 20 within the backer paper cover sheet 14 surprisingly increase the bonding performance between the gypsum core 12 and the backer paper cover sheet 14. The improved bonding performance can be particularly evident when the gypsum used to form the gypsum core 12 has a high salt concentration.

An optional thin, dense gypsum layer (low-density region) 22 lies between the gypsum core 12 and the facer paper cover sheet 18 to contact the gypsum core 12 and the facer paper cover sheet 18. Thus, thin, dense gypsum layer 22 is interposed between the gypsum core 12 and the facer paper cover sheet 18. Another optional thin, dense gypsum layer (not shown) may be interposed between and contact the gypsum core 12 and the backer paper cover sheet 14. Generally the gypsum core 12 and the thin, dense gypsum layer 22 have the same composition and are contiguous with one another. Collectively, the gypsum core 12 and the thin, dense gypsum layer 22 may define the interior of gypsum board 10, with the gypsum core 12 being a low-density region or layer and the thin, dense gypsum layer 22 being a relatively higher-density region or layer. Typically, the aqueous gypsum slurry used to form the gypsum core 12 has been foamed. Thus, the low-density region may be formed from a gypsum slurry in a foamed state. In contrast, the aqueous gypsum slurry used for forming the thin, dense gypsum layer 22 has not been foamed. Thus, the high-density region may be in formed from a gypsum slurry that is not foamed. Thus, the thin, dense gypsum layer 22 is relatively denser than the rest of gypsum core 12.

Thus, the high-density region may have a lower porosity associated therewith than does the low-density region. Typically the thin, dense gypsum layer 22 is applied to an inner surface of a selected cover sheet. If present, the thin, dense gypsum layer 22 is interposed between the cover sheet and the low-density region (gypsum core 12).

One or more chloride salts in a specified amount may be present in the gypsum core 12 according to the present disclosure. If a high-density region (thin, dense gypsum layer 22) is included, the one or more chloride salts may also be present therein. Generally, the one or more chloride salts may be selected from the group consisting of NaCl, KCl, $MgCl_2$, $CaCl_2$) and any combination thereof.

The concentration of the chloride anion in the aqueous slurry used to make the board core 12 and, if present, the high-density region (thin, dense gypsum layer 22) may range from about 500 ppm to about 3000 ppm, typically from about 500 ppm to about 2000 ppm per 1,000,000 parts by weight calcium sulfate hemihydrate, more typically from about 500 ppm to about 1500 ppm, per 1,000,000 parts by weight calcium sulfate hemihydrate.

Due to salt passing through the perforations some of the salt from the original aqueous gypsum slurry may not remain in the core 12 and, if present, the high-density region (thin, dense gypsum layer 22), but it may be in the pore of perforation or outside of the paper sheet.

Methods for Manufacture

Various methods can be employed for preparing a gypsum board of the present invention from an aqueous gypsum slurry comprising calcium sulfate hemihydrate and a high amount of chloride salt. However, instead of a conventional gypsum source, a gypsum source containing the one or more chloride salts, as described above, may be substituted in the manufacturing process.

The base material from which gypsum wallboard and other gypsum products are manufactured is the hemihydrate form of calcium sulfate ($CaSO_4 \cdot \frac{1}{2}H_2O$), commonly termed "calcined gypsum" or "stucco," which is produced by heat conversion (calcination) of the dihydrate form of calcium sulfate ($CaSO_4$).

The present invention encompasses methods for making a gypsum board, comprising:

preparing an aqueous slurry comprising a mixture of water and stucco, wherein the stucco comprises calcium sulfate hemihydrate, and the aqueous slurry comprises a mixture of:

at least 60 weight percent said calcium sulfate hemihydrate on a dry basis, about 500 ppm to about 3000 ppm chloride anions of per 1,000,000 parts by weight (pbw) said calcium sulfate hemihydrate, and the water at a weight ratio of water to the calcium sulfate hemihydrate of 0.2:1 to 1.2:1; and disposing the aqueous slurry between a front paper cover sheet and a back paper cover sheet, each paper cover sheet having an inner surface and an outer surface, and the aqueous slurry contacts the inner surfaces of the front paper cover sheet and the back paper cover sheet;

wherein the back paper cover sheet comprises a plurality of perforations extending therethrough;

setting the calcium sulfate hemihydrate to form a panel comprising a board core layer comprising calcium sulfate dihydrate; and drying the panel and cutting the panel into a gypsum board having one or more pre-determined dimensions.

Illustrative manufacturing techniques and equipment suitable for forming gypsum board according to the present invention can be found, for example, in U.S. Pat. No. 7,364,676 and U.S. Patent Application Publication 2010/0247937, each of which is incorporated herein by reference in its entirety. Briefly, such processes may involve discharging a cover sheet onto a moving conveyor. Since gypsum board is normally formed "face down," this cover sheet corresponds to facer paper cover sheet 18 upon completion of the fabrication process. The gypsum slurry can be made with any suitable water/calcium sulfate hemihydrate ratio for disposition onto the cover sheet.

To produce gypsum board, the stucco is mixed with water and additives to form an aqueous slurry which is continuously fed between continuous layers of paper on a board machine. One paper cover sheet is called the face paper sheet, or facer, and the other paper cover sheet is called the back paper sheet, or backer. As the board moves down a conveyer line to form a panel, the calcium sulfate recrystallizes or rehydrates, reverting to its original rock state. The paper becomes chemically and mechanically bonded to the board core layer as the gypsum sets. The panel is then cut to length and conveyed through dryers to remove any free moisture.

Dry and/or wet components of the gypsum slurry are fed to a mixer (e.g., a pin mixer), where they are agitated to form the gypsum slurry. The mixer comprises a main body and a discharge conduit (e.g., a gate-canister-boot arrangement as known in the art, or an alternative arrangement, such as that described in U.S. Pat. Nos. 6,494,609 and 6,874,930, which are incorporated herein by reference in their entirety). In some process configurations, the discharge conduit may include a slurry distributor with either a single feed inlet or multiple feed inlets, such as those described in U.S. Patent Application Publication 2012/0168527 and 2012/0170403, which are incorporated herein by reference in their entirety. When using a slurry distributor with multiple feed inlets, the discharge conduit can include a suitable flow splitter, such as those described in U.S. Patent Application Publication 2012/0170403. Foaming agent (typically soap) can be added in the discharge conduit of the mixer (e.g., in the gate as described, for example, in U.S. Pat. Nos. 5,683,635 and 6,494,609, which are incorporated herein by reference) or in the main body, if desired. Slurry discharged from the discharge conduit after all ingredients have been added, including foaming agent, is the primary gypsum slurry and is used to form the board core layer. This gypsum slurry is discharged onto the moving front cover sheet.

After mixing, the aqueous slurry optionally has foam added to decrease the product density. Foam is generated by combining soap and water. The foam is then injected into the aqueous slurry after it exits from the mixer through a hose or chute. The foam ring is an apparatus having multiple ports that are arranged in a ring perpendicular to the axis of the hose so that foam is forced under pressure into the aqueous slurry as it passes by the foam ring. Foam is typically added to the portion of slurry for the less dense core layer, but not for the portion of slurry for the skim coat.

When the foam and the slurry have been brought together, the resulting slurry moves toward and is poured onto a conveyor lined with a first piece of facing material which is the front cover sheet (e.g., facer paper cover sheet 18). Another piece of facing material which is the perforated back cover sheet (e.g., backer paper cover sheet 14) is placed on top of the slurry, forming a sandwich assembly with the slurry between the two facing materials. The sandwich assembly is fed to a forming plate, the height of which determines the thickness of the board. Next the continuous sandwich assembly is cut into appropriate lengths at a cutting knife, usually eight feet to twelve feet. During this processing the slurry is allowed to harden (set) to form a board core comprising an interlocking crystalline matrix of set gypsum.

The boards are then moved to a kiln for drying. Temperatures in the kiln typically range from 450° F. to 500° F. maximum. Preferably there are three or more temperature zones in the kiln. In the first zone contacted by the wet board, the temperature increases to the maximum temperature, while the temperature slowly decreases in the last two zones. The blower for the first zone is positioned at the exit of the zone, blowing the air countercurrent to the direction of board travel. In the second and third zones, the blowers are located at the entrance to the zone, directing the hot air co-current with board travel. Heating that is less severe in the last zone prevents calcination of dry areas of the board, causing poor paper bond. A typical residence time in the kiln is about forty minutes, but the time will vary depending on the line capacity, the wetness of the board and other factors.

As described above, one or both of the cover sheets in a gypsum board may optionally be in interfacial contact with a high-density region or layer of the board core layer, also known as a skim coat. The skim coat may be contiguous with the board core layer after setting. Where foam is inserted into the discharge conduit, a stream of secondary gypsum slurry can be removed from the mixer body before foaming to provide a slurry for forming the skim coat. If present, the skim coat may be deposited onto the moving front cover sheet before the main portion of the gypsum slurry is deposited for forming the board core layer, with deposition of the skim coat usually occurring upstream of the mixer. After being discharged from the discharge conduit, the gypsum slurry is spread, as necessary, over the front cover sheet (optionally bearing a skim coat). At this point, the spread gypsum slurry is contacted with a second cover sheet, which may correspond to the back cover sheet. The resulting wet assembly is in the form of a sandwich assembly, which is a precursor to the final gypsum board product. The back cover sheet may optionally bear a second skim coat, which can be formed from the same or different secondary gypsum slurry as for the skim coat on the front cover sheet, if present.

The gypsum core (e.g., gypsum core 12 of FIG. 1) resulting from the set gypsum core slurry generally has a thickness of 0.25 inches to 1.5 inches and a density of 15 to 55 pounds/cubic foot. When foamed, the gypsum core resulting from the set foamed gypsum slurry has a total void volume of 10 to 92 volume percent, particularly 25 to 90 volume percent, and more particularly 30 to 85 volume percent. In contrast, the resulting skim layer, if present, has a total void volume of less than 30 volume percent.

The back cover sheet (back paper facer sheet) may be perforated before the back cover sheet is contacted with the gypsum slurry. The back cover sheet may be sourced/acquired from a manufacturer with the perforations already present, or the perforations may be introduced just prior to contacting the back cover sheet with the gypsum slurry. As such, the perforations do not extend into the board core layer or the gypsum slurry prior to setting. For example, the plurality of perforations may be introduced using a suitable wallboard perforation apparatus, such as that described in U.S. Patent Application Publication 2018/0065336. It is to be appreciated that any suitable wallboard perforation apparatus may be used, however.

Gypsum and Stucco (Calcined Gypsum)

The calcium sulfate hemihydrate (typically provided in the raw material known as stucco or calcined gypsum) component used to form the crystalline matrix of the gypsum panel core typically comprises beta calcium sulfate hemihydrate, water-soluble calcium sulfate anhydrite, alpha calcium sulfate hemihydrate, or mixtures of any or all of these, and obtained from natural or synthetic sources. In some aspects, the stucco may include non-gypsum minerals, such as minor amounts of clays or other components that are associated with the gypsum source or are added during the calcination, processing and/or delivery of the stucco to the mixer. The stucco can be fibrous or non-fibrous. Typically the raw stucco has at least 70 wt. % calcium sulfate hemihydrate, preferably at least 80 wt. % calcium sulfate hemihydrate, more preferably at least 85 wt. % calcium sulfate hemihydrate, and furthermore preferably at least 90 wt. % calcium sulfate hemihydrate.

Chloride Salts

The aqueous gypsum slurry for forming the gypsum board of the invention comprises water and stucco, wherein the aqueous gypsum slurry also contains chloride anions. The chloride anions may arise from one or more chloride salts from any source. Generally, the one or more chloride salts are present in the gypsum source used to form the core of the board of the invention. Thus, all or at least a majority of the one or more chloride salts may be introduced to the gypsum slurry from the source of gypsum that is used. The gypsum source may be a synthetic gypsum source, particularly a low-quality synthetic gypsum obtained from a power plant flue gas stream. Such a low-quality gypsum source may not otherwise be suitable for forming a wall board without using at least one starch layer, according to the present invention. The one or more chloride salts may also arise from impurities, such as one or more chloride salts, in water used to make the aqueous gypsum slurry.

Chloride salts are any salts which contain chloride. Thus, they include monovalent salts of chloride anion and a monovalent cation, such as sodium or potassium. Thus, they include divalent salts of chloride anions and a divalent cation, such as calcium or magnesium. Other chloride salts, are also contemplated, such as trivalent salts of chloride anions and a trivalent cation.

The concentration of the chloride anions of the one or more chloride salts in the aqueous slurry used to make the board core and, if present, the high-density region (thin, dense gypsum layer) of the invention may range from about 500 ppm to about 3000 ppm, typically from about 500 ppm to about 2000 ppm per 1,000,000 parts by weight calcium sulfate hemihydrate, more typically from about 500 ppm to about 1500 ppm per 1,000,000 parts by weight calcium sulfate hemihydrate.

Additives

Other additives that may be present in the gypsum slurry used to form the board core layer include, but are not limited to, strengthening agents, foam (prepared from a suitable foaming agent), dispersants, polyphosphates (e.g., sodium trimetaphosphate), retarders, accelerators, recalcination inhibitors, binders, adhesives, secondary dispersing aids, leveling or non-leveling agents, thickeners, bactericides, fungicides, pH adjusters, buffers, colorants, reinforcing materials, fire retardants, water repellants (for example siloxane), fillers, starches, and mixtures thereof.

Additives and other components of the gypsum slurry may be added to the mixer in various ways. For example, various combinations of components may be pre-mixed before entering the mixer, either as one or more dry components and/or as one or more wet components. Singular components may similarly be introduced to the mixer in wet or dry form. If introduced in a wet form, the components may be included in a carrier fluid, such as water, in any suitable concentration.

Fibers can optionally be used in the methods and composition of the present invention. The fibers may include mineral fibers (also known as mineral wool), glass fibers, carbon fibers, and mixtures of such fibers, as well as other comparable fibers providing comparable benefits to the wallboard. For example, glass fibers can be incorporated in the gypsum core slurry and/or the skim layer slurry and resulting crystalline core structure. The glass fibers in such aspects may have an average length of about 0.5 to about 0.75 inches and a diameter of about 11 to about 17 microns. In other aspects, such glass fibers may have an average length of about 0.5 to about 0.675 inches and a diameter of about 13 to about 16 microns. In yet other aspects, E-glass fibers are utilized having a softening point above about 800° C. or above at least about 900° C. Mineral wool or carbon fibers such as those known to those of ordinary skill may be used in place of or in combination with glass fibers.

Fibers, when included, can be present in the gypsum core slurry and/or the skim layer slurry in amounts on a dry basis per 100 pbw (pbw=parts by weight) of calcium sulfate hemihydrate of about 0.5 to about 10 pbw; preferably about 1 to about 8 pbw; more preferably about 2 to about 7 pbw; and most preferably about 3 to about 6 pbw. There may also be an absence of fibers.

Optionally, one or more phosphate-containing compounds can also be included in the slurry, if desired. For example, these phosphate-containing components can include water-soluble components and can be in the form of an ion, a salt, or an acid, namely, condensed phosphoric acids, each of which comprises two or more phosphoric acid units; salts or ions of condensed phosphates, each of which comprises two or more phosphate units; and monobasic salts or monovalent ions of orthophosphates as well as water-soluble acyclic polyphosphate salts. Illustrative examples are described in U.S. Pat. Nos. 6,342,284; 6,632,550; 6,815,049; and 6,822,033, which are incorporated herein by reference in their entirety.

Phosphate-containing components can enhance green strength, resistance to permanent deformation (e.g., sag), dimensional stability, and the like. Trimetaphosphate compounds can be used, including, for example, sodium trimetaphosphate, potassium trimetaphosphate, lithium trimetaphosphate, and ammonium trimetaphosphate. Sodium trimetaphosphate (STMP) is commonly used, although other phosphates may be suitable, including for example sodium tetrametaphosphate, sodium hexametaphosphate having from about 6 to about 27 repeating phosphate units and having the molecular formula $Na_{n+2}P_nO_{3n+1}$ wherein n=6-27, tetrapotassium pyrophosphate having the molecular formula $K_4P_2O_7$, trisodium dipotassium tripolyphosphate having the molecular formula $Na_3K_2P_3O_{10}$, sodium tripolyphosphate having the molecular formula $Na_5P_3O_{10}$, tetrasodium pyrophosphate having the molecular formula $Na_4P_2O_7$, aluminum trimetaphosphate having the molecular formula $Al(PO_3)_3$, sodium acid pyrophosphate having the molecular formula $Na_2H_2P_2O_7$, ammonium polyphosphate having 1000-3000 repeating phosphate units and having the molecular formula $(NH_4)_{n+2}P_nO_{3n+1}$ wherein n=1000-3000, or polyphosphoric acid having two or more repeating phosphoric acid units and having the molecular formula $H_{n+2}P_nO_{3n+1}$ wherein n is two or more.

The phosphates usually are added in a dry form and/or an aqueous solution liquid form, with the dry ingredients added to the slurry mixer, with the liquid ingredients added to the mixer, or in other stages or procedures.

When present, the phosphate can be included in the gypsum slurry in a dry form or in a form in water (e.g., a phosphate solution from about 5% to about 20%, such as about a 10% solution). If included, the phosphate can be present in any suitable amount (solids/solids basis), such as from about 0.01% to about 0.5% by weight of the stucco, e.g., from about 0.03% to about 0.4%, from about 0.1% to about 0.3%, or from about 0.12% to about 0.4% by weight of the stucco. There may also be an absence of phosphate.

The gypsum slurry can optionally include at least one dispersant to enhance fluidity. The dispersant(s) may be introduced to the gypsum slurry in a dry form, optionally with other additives, and/or in a liquid form, optionally with other liquid components. Examples of suitable dispersants include naphthalene sulfonates, such as polynaphthalene sulfonic acid and its salts (polynaphthalenesulfonates) and derivatives, which are condensation products of naphthalenesulfonic acids and formaldehyde, as well as polycarboxylate dispersants, such as polycarboxylic ethers, for example. Other examples of suitable dispersants include lignosulfonates or sulfonated lignin. Lignosulfonates are water-soluble anionic polyelectrolyte polymers, which are byproducts from the production of wood pulp using sulfite pulping.

Lower molecular weight dispersants may be desirable. Lower molecular weight naphthalene sulfonate dispersants may be favored because they trend to a lower water demand than higher viscosity, higher molecular weight dispersants. Thus, molecular weights from about 3,000 to about 10,000 (e.g., about 8,000 to about 10,000) may be desirable molecular weights for a dispersant. If desired, the molecular weight of the polycarboxylate dispersants can be from about 20,000 to about 60,000, which may exhibit less retardation than dispersants having molecular weights above about 60,000.

Typical naphthalenesulfonates are a naphthalene sulfonate solution in water, having a range of about 35% to about 55% by weight naphthalenesulfonate solids content. However, if desired the naphthalenesulfonates can be used in dry solid or powder form.

When present, the dispersant can be included in the gypsum slurry in any suitable (solids/solids) amount, such as, for example, about 0.1% to about 5% by weight of the stucco, e.g., about 0.1% to about 4%, about 0.1% to about 3%, about 0.2% to about 3%, about 0.5% to about 3%, about 0.5% to about 2.5%, about 0.5% to about 2%, about 0.5% to about 1.5%, or the like. There may also be an absence of any one or more of polynaphthalenesulfonates, polycarboxylic ethers or lignosulfonates.

Accelerators and/or retarders may be added to the gypsum core slurry and/or the skim layer slurry to modify the rate at which the calcium sulfate hemihydrate hydration reactions take place. Suitable accelerators may include, for example, wet gypsum accelerator, heat resistant accelerator (HRA), or climate stabilized accelerator (CSA). "CSA" is a set accelerator including 95% calcium sulfate dihydrate co-ground with 5% sugar and heated to 250° F. (121° C.) to caramelize the sugar. CSA is available from USG Corporation and is made according to U.S. Pat. Nos. 3,573,947 and 6,409,825, herein incorporated by reference. Potassium sulfate is another preferred accelerator. HRA (Heat Resistant Accelerator), which is a preferred accelerator, is calcium sulfate dihydrate freshly ground with sugar at a ratio of about 5 to 25 pounds of sugar per 100 pounds of calcium sulfate dihydrate. It is further described in U.S. Pat. No. 2,078,199, herein incorporated by reference. Both of these are preferred accelerators. When present, the accelerator and/or retarder each can be incorporated in the gypsum slurry in an amount on a solid basis of, e.g., about 0% to about 10% by weight of the stucco (e.g., about 0.1% to about 10%), such as, for example, from about 0% to about 5% by weight of the stucco (e.g., about 0.1% to about 5%). Suitable accelerators may include, for example, calcium sulfate dihydrate, carbohydrate-coated calcium sulfate, calcium sulfate dihydrate/organic phosphonate, and calcium sulfate dihydrate/organic phosphate. There may also be an absence of accelerators and/or retarders.

Foam (also known as foam water) may optionally be introduced into the gypsum core slurry and/or the skim layer slurry (preferably the gypsum core slurry) in amounts that provide the above mentioned reduced core density and panel weight. The foaming agent to produce the foam is typically a soap or other suitable surfactant. The introduction of foam in the gypsum core slurry in the proper amounts, formulations, and process will produce a desired network and distribution of voids within the core of the final dried wallboards. This void structure permits the reduction of the gypsum and other core constituents and the core density and weight, while maintaining desired panel structural and strength properties. If present, foaming agents may comprise a major weight portion of unstable component and a minor weight portion of stable component (e.g., where unstable and blend of stable/unstable are combined). The weight ratio of unstable component to stable component is effective to form an air void distribution within the set gypsum core, as described in U.S. Pat. Nos. 5,643,510; 6,342,284; and 6,632,550, which are incorporated herein by reference in their entirety. The approaches for adding foam to a gypsum core slurry are known in the art and one example of such an approach is discussed in U.S. Pat. No. 5,683,635, the disclosure of which is incorporated by reference herein. Evaporative water voids, generally having voids of about 5 μm or less in diameter, also contribute to the total void distribution along with the aforementioned air (foam) voids. The volume ratio of voids with a pore size greater than about 5 microns to the voids with a pore size of about 5 microns or less, is from about 0.5:1 to about 9:1, such as, for example, about 0.7:1 to about 9:1, about 1.8:1 to about 2.3:1, or the like. The foaming agent is present in the gypsum slurry in an amount, for example, of less than about 0.5% by weight of the stucco, such as about 0.01% to about 0.5%, about 0.01% to about 0.2%, about 0.02% to about 0.4%, about 0.02% to about 0.2%, about 0.01% to about 0.1%, or the like. There may also be an absence of foaming agents.

Components for fire and/or water resistance can also be included in the gypsum slurry. Examples include, for instance, siloxanes (water resistance); fiber; heat sink additives such as aluminum trihydrite (ATH), magnesium hydroxide or the like; and/or high expansion particles (e.g., expandable to about 300% or more of original volume when heated for about one hour at 1560° F.). Further disclosure on such additives may be found in U.S. Pat. No. 8,323,785, which is incorporated by reference in its entirety. High expansion vermiculite may be included, although other fire resistant materials can be included. If present, fire or water resistance additives can be included in any suitable amount as desired depending, e.g., on fire rating, and like performance parameters. For example, if included, the fire or water resistance additives can be individually present in an amount from about 0.5% to about 10% by weight of the stucco, such as from about 1% to about 10%, about 1% to about 8%, about 2% to about 10%, about 2% to about 8%, or the like. If included, the siloxane may desirably be introduced in the form of an emulsion. The slurry may then be shaped and dried under conditions which promote the polymerization of the siloxane to form a highly crosslinked silicone resin. A catalyst which promotes the polymerization of the siloxane to form a highly crosslinked silicone resin can be added to the gypsum slurry. Solventless methyl hydrogen siloxane fluid can be used as the siloxane. This product is a siloxane fluid containing no water or solvents. It is contemplated that about 0.3% to about 1.0% of the siloxane may be used if desired, based on the weight of the dry ingredients. For example, if desired, about 0.4% to about 0.8% siloxane may be present in the gypsum slurry based on the dry stucco weight. There may also be an absence of any one or more of these components for fire and/or water resistance. For example, there may be an absence of siloxane.

The starch, when present, can be a pre-gelatinized (cooked) starch and/or an uncooked starch. In this regard, starches are classified as carbohydrates and contain two types of polysaccharides: linear amylose and branched amylopectin. Starch granules are semi-crystalline, e.g., as seen under polarized light, and are insoluble in water at room temperature or near room temperature. Uncooked starches are characterized as being cold water insoluble and having a semi-crystalline structure. Typically, uncooked starches are obtained by wet milling and are not modified by heating wet starch as in the case of cooked starches. Pre-gelatinized, or cooked, starches are characterized as being cold water soluble and having a non-crystalline structure. There may also be an absence of starch.

Water

Water is added to the slurry in any amount that makes the slurry flowable. The amount of water to be used varies greatly according to the application with which it is being used, the exact dispersant being used, the properties of the calcium sulfate hemihydrate, and the additives being used.

Water used to make the slurry should be as pure as practical for best control of the properties of both the slurry and the set plaster. Salts and organic compounds are well known to modify the set time of the slurry, varying widely from accelerators to set inhibitors. Some impurities lead to irregularities in the structure as the interlocking matrix of dihydrate crystals forms, reducing the strength of the set product. Product strength and consistency is thus enhanced by the use of water that is as contaminant-free as practical.

The water can be present in the gypsum core slurry and/or the skim layer slurry of the present invention at a weight ratio of water to calcium sulfate hemihydrate of about 0.2:1 to about 1.2:1; preferably, about 0.3:1 to about 1.1:1; more preferably, about 0.6:1 to about 1:1; most preferably 0.7:1 to 0.95:1; and typically about 0.85:1.

Back Cover Sheet, Front Cover Sheet, and Perforations

The back paper cover sheet and the front cover sheet may be made from any suitable paper material having any suitable basis weight.

According to the present invention, only the back cover sheet of the gypsum board contains a plurality of perforations extending therethrough. The back cover sheet is made of perforated paper.

The back and front cover sheets are made of paper. However, the paper materials for each cover sheet may be the same or different.

Various paper grades can be used in gypsum panels, including Manila grade paper with a smooth calendared finish is often used as the facer paper cover sheet, and Newsline paper with a rougher finish is often used as the backer paper cover sheet. Typically both paper grades are multi-ply with at least one liner ply and several filler plies. However, if desired, at least one paper cover sheet or both paper cover sheets may be made of single-ply paper.

If desired, to enhance strength (e.g., nail pull strength), especially for lower density gypsum boards, one or both of the cover sheets can be formed from paper having a basis weight of, for example, at least about 45 lbs/MSF (e.g., from about 45 to about 65 lbs/MSF, about 45 to about 60 lbs/MSF, about 45 to about 55 lbs/MSF, about 50 to about 65 lbs/MSF, about 50 to about 60 lbs/MSF, or the like). If desired, the front cover sheet may have a higher basis weight than does the back cover sheet, which may provide enhanced nail pull resistance and handling. The back cover sheet can have a lower basis weight if desired (e.g., a basis weight of less than 45 lbs/MSF, e.g., from about 33 to 45 lbs/MSF (e.g., about 33 to about 40 lbs/MSF).

As mentioned above, the back cover sheet contains a plurality of perforations. The plurality of perforations may be arranged in the back cover sheet in any suitable manner. Typically, the perforations are arranged in a pattern, such as a regular grid or array of perforations (see FIG. 2, for example). Other patterned arrangements of perforations also reside within the scope of the present disclosure, and the particular arrangement of perforations shown in FIG. 2 should not be considered limiting. Illustrative equipment for perforating one or more of the cover sheets in gypsum board in a manner consistent with the present disclosure is described in U.S. Patent Application Publication 2018/0065336, which is incorporated herein by reference in its entirety.

The perforations in the cover sheet are present at a shape, size, and perforation density suitable to support drying and/or increased adhesion in the gypsum board.

Typically, the perforations have a substantially circular shape. It is to be appreciated, however, that the perforations may have alternative geometric shapes such as oval, triangular, square, rectangular, or the like. Any combination of circular and non-circular perforations may be present, depending on the requirements for a particular application. Any combination of non-circular perforations may be present.

Each of the perforations within the cover sheet(s), particularly the back cover sheet may define an opening having a size that ranges from about 0.005 inches to about 0.1 inches in its largest transverse dimension, preferably from about 0.01 inches to about 0.1 inches in size, and more preferably from about 0.01 inches to about 0.02 inches in size. The term "largest transverse dimension" represents the largest dimension measured across each perforation within the plane of the cover sheet(s). For circular perforations, the largest transverse dimension represents diameter of a circular opening.

The perforations within the back cover sheet are typically the same size and shape. However, the perforations may be a mixture of perforation sizes and/or shapes. The perforation sizes, whether the same or different, may reside within any of the ranges specified above. Moreover, when at least some of the perforations have different shapes, a first plurality of perforations having a first shape and a first size and a second plurality of perforations having a different shape and/or a different size may be present. For example, a first plurality of perforations and a second plurality of perforations may have different shapes but substantially the same size.

The perforation coverage density refers to the number of perforations per unit area in the back cover sheet. The perforations present within the back cover sheet are present in a suitable perforation coverage density to promote effective board core layer adhesion. The perforation density within the cover sheet(s) may be about 5 to about 50 perforations/in$^2$, preferably about 12 to about 25 perforations/in$^2$, for example about 10 to about 15 perforations/in$^2$, or for example about 15 to about 20 perforations/in$^2$.

Typically the perforations are 0.1 to 10%, more typically 0.5 to 5% of the surface of the back cover sheet.

Systems

Figure 3:
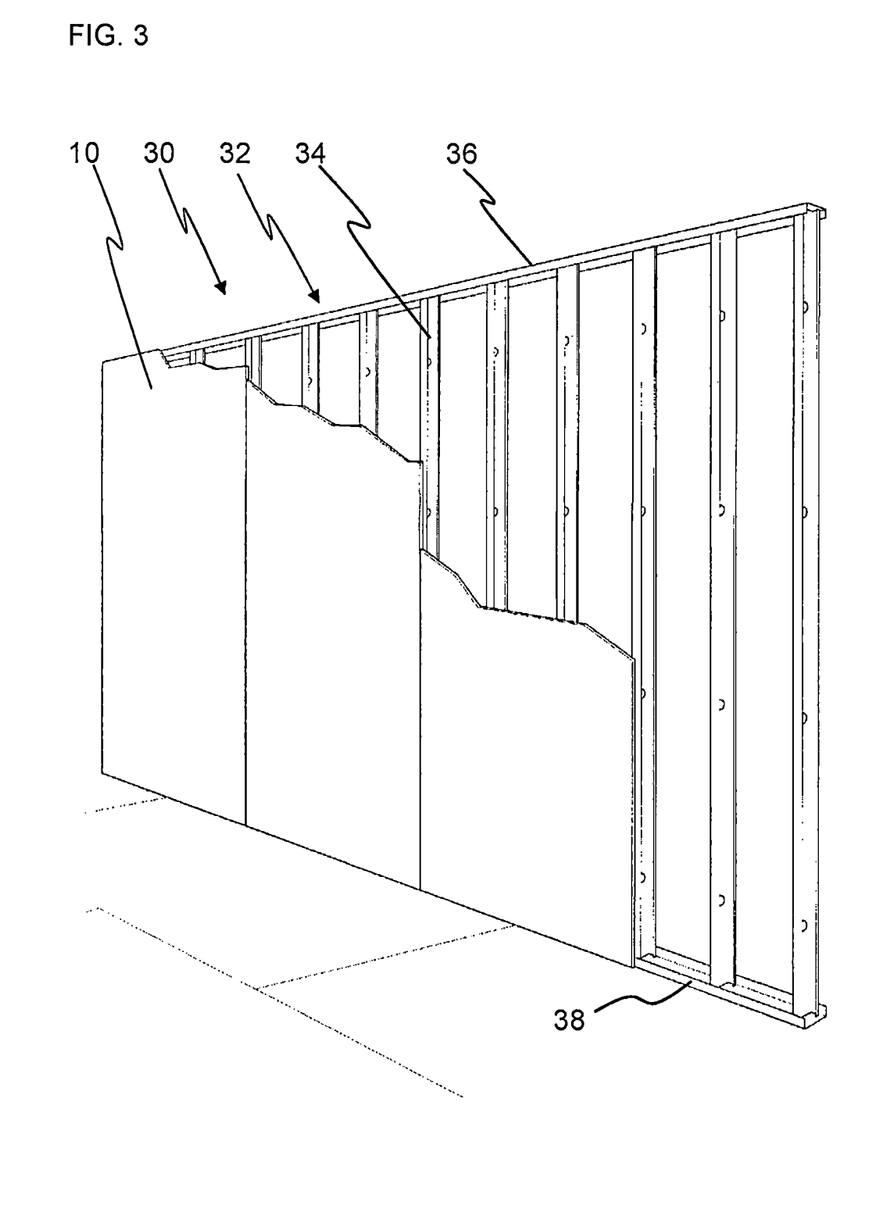
FIG. 3 shows a perspective view of a gypsum board of the present invention attached to one side of a metal stud wall suitable for use in an illustrative wall system of the present invention.

FIG. 3 is a perspective view of a typical exterior sheathing system 30 that may be employed in the present exterior wall system. FIG. 3 shows metal stud wall "skeleton" 32 which includes a plurality of metal studs 34, an upper track 36, and a lower track 38. Gypsum boards 10 (FIG. 1) may be secured in any known manner to one or both sides of the metal studs 34 to close the wall and form the interior surface or surfaces of the wall or a ceiling. A typical metal stud wall "skeleton" may be fabricated according to U.S. Pat. No. 6,694,695 to Collins et al., incorporated herein by reference, which is suitable for combination with an exterior sheathing panel to achieve an exterior wall system of the present invention. This metal frame system is merely provided as illustrative as other metal frames may also be employed. Further alternately, the stud wall may alternately comprise wooden studs.

The following examples further illustrate the invention but, of course, should not be construed as in any way limiting its scope.

EXAMPLES

Gypsum core (slurry) formulations with a high concentration of various salts were prepared as specified in Table 1. The source of chloride anions (samples #1-#4) was sodium chloride (NaCl), magnesium chloride (MgCl$_2$) or calcium chloride (CaCl$_2$). Each of samples #1-#4 also contained sodium trimetaphosphate (TMP). To test the effects of TMP in insolation of the other salts, samples #5 and #6 only contained TMP.

For the perforated paper sheet tested in these Examples, the distance between adjacent perforations was ¼". The diameter of the perforations was about 0.01 to 0.02 inch.

Figure 4:
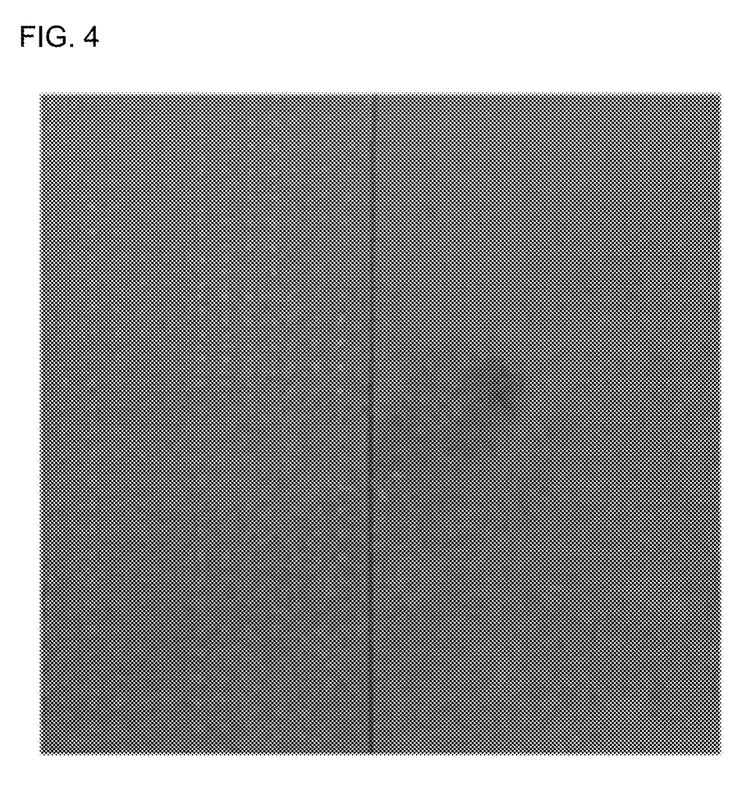
FIG. 4 shows a photograph of a back cover sheet that has a plurality of perforations extending therethrough.

12"×12"×½" envelopes were made by using Manila paper (48#/MSF) as a front cover sheet and Newsline paper (42#/MSF) as a back cover sheet. Prior to pouring the slurry formulations (Table 1) into the envelope, half of the Newsline paper (6"×12") was perforated using a wallboard perforator as shown in FIG. 4. The distance between adjacent perforations was ¼". The diameter of the perforations was about 0.01 to 0.02 inch.

The slurry formulations (Table 1) were prepared by soaking dry powders in solution for 10 seconds and mixing for 10 seconds in a Hobart mixer, followed by injecting the resulting foam for 8 seconds and mixing another 2 seconds. The slurry thus obtained was poured into each of the envelopes. After the slurry had set and hardened, the envelope was sealed using a paper tape. The sealed board was dried at 450° F. for 20 minutes and then moved to a 350° F. oven. After drying at 350° F. for 15 minutes, the board was further dried at 110° F. overnight.

The effects of perforation of the back cover sheet were evaluated by an "X" cut method to test the paper-to-core bond. Several "X"-shaped cuts were made on the back paper of the finished wallboard samples, at least two "X"-shaped cuts being made in the perforated section of the back paper and at least two "X"-shaped cuts being made in the unperforated section (FIG. 4). The size of the "X"-shaped cut was about 2 inches×2 inches. The paper was peeled from the center of the cut. The samples were evaluated qualitatively in comparison to one another by evaluating the amount of paper remaining on the gypsum core on one side of the back paper versus to the other (i.e., perforated versus unperforated sections). If there is good adhesion to the gypsum core, a thin layer of paper remains on the core. In contrast, if there is poor adhesion to the core, the paper peels off from the core and leaves more of the core exposed.

FIGS. 5-9 show photographs demonstrating the effect of various salts upon adhesion within gypsum boards of the invention having and lacking perforation within the back cover sheet.

TABLE 1

| CORE | 600 ppm Cl (NaCl) | 800 ppm Cl (NaCl) | 800 ppm Cl (CaCl$_2$) | 800 ppm Cl (MgCl$_2$) | 30 ppm Cl (NaCl) Perforated paper | 30 ppm Cl (NaCl)Non-perforated paper |
|---|---|---|---|---|---|---|
| Sample ID | #1 | #2 | #3 | #4 | #5 | #6 |
| Thickness | ½" | ½" | ½" | ½" | ½" | ½" |
| Stucco (g) | 900 | 900 | 900 | 900 | 900 | 900 |
| HRA (g)$^1$ | 3.6 | 3.6 | 3.6 | 3.6 | 3.6 | 3.6 |
| cooked (also known as pre-gelled) corn starch (g) | 2.7 | 2.7 | 2.7 | 2.7 | 2.7 | 2.7 |
| Fiberglass (g) | 2.5 | 2.5 | 2.5 | 2.5 | 2.5 | 2.5 |
| NaCl (g) | 0.89 | 1.19 | — | — | 0.045 | 0.045 |
| MgCl$_2$ (g) | — | — | — | 0.97 | — | — |
| CaCl$_2$ (g) | — | — | 1.18 | — | — | — |
| 10% Sodium Trimetaphosphate Solution$^2$ (g) | 5.4 | 5.4 | 5.4 | 5.4 | 32 | 44 |
| 1% Retarder$^2$ (g) | 9 | 9 | 9 | 9 | 9 | 9 |
| Dispersant (g) | 0.9 | 0.9 | 0.9 | 0.9 | 0.9 | 0.9 |
| Gauge water (g) | 836 | 836 | 836 | 836 | 836 | 836 |

$^1$HRA = heat resistant accelerator
$^2$grams of solution, % is wt. %

FIGS. 5-8 respectively show photographs of sample boards #1-#4.

Figure 5:
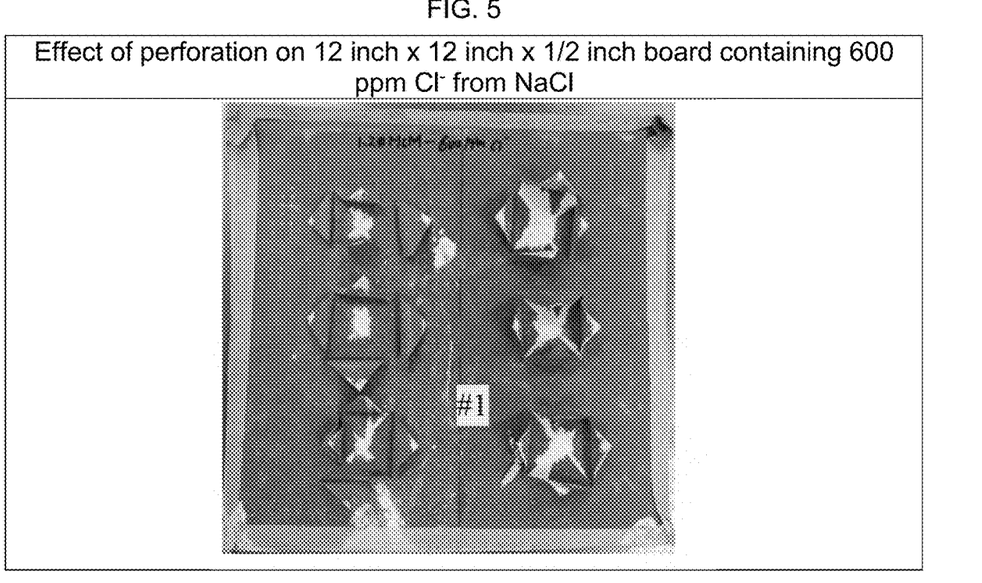
FIGS. 5-8 show photographs demonstrating the effect of various salts upon adhesion to the board core layer in 12 inch×12 inch×½ inch gypsum boards having and lacking perforations within the back cover sheet.

FIG. 5 shows the effect of perforation on 12 inch×12 inch×½ inch sample board #1 containing 600 ppm Cl⁻ from NaCl.

Figure 6:
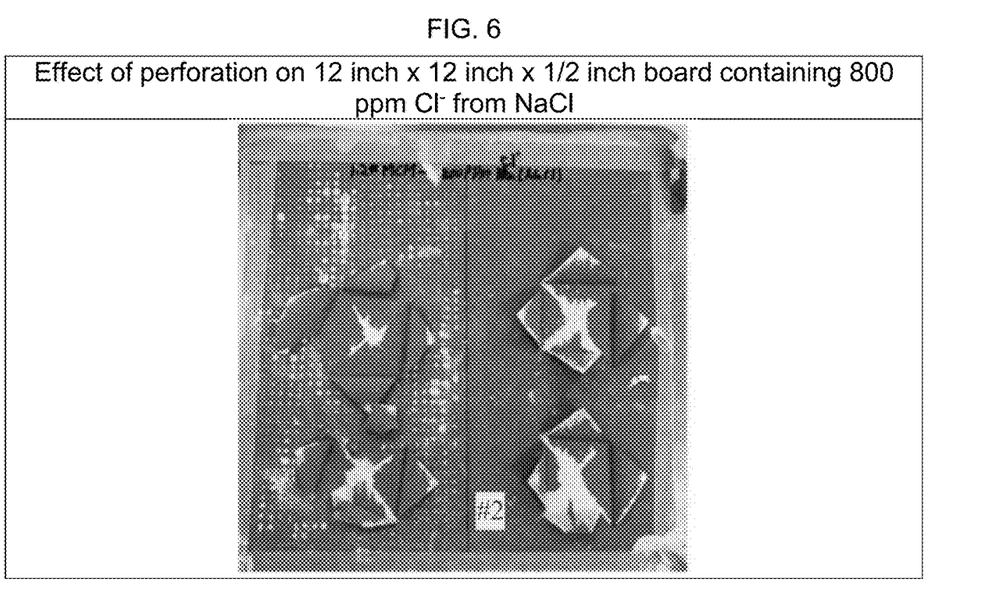

FIG. 6 shows the effect of perforation on 12 inch×12 inch×½ inch sample board #2 containing 800 ppm Cl⁻ from NaCl.

Figure 7:
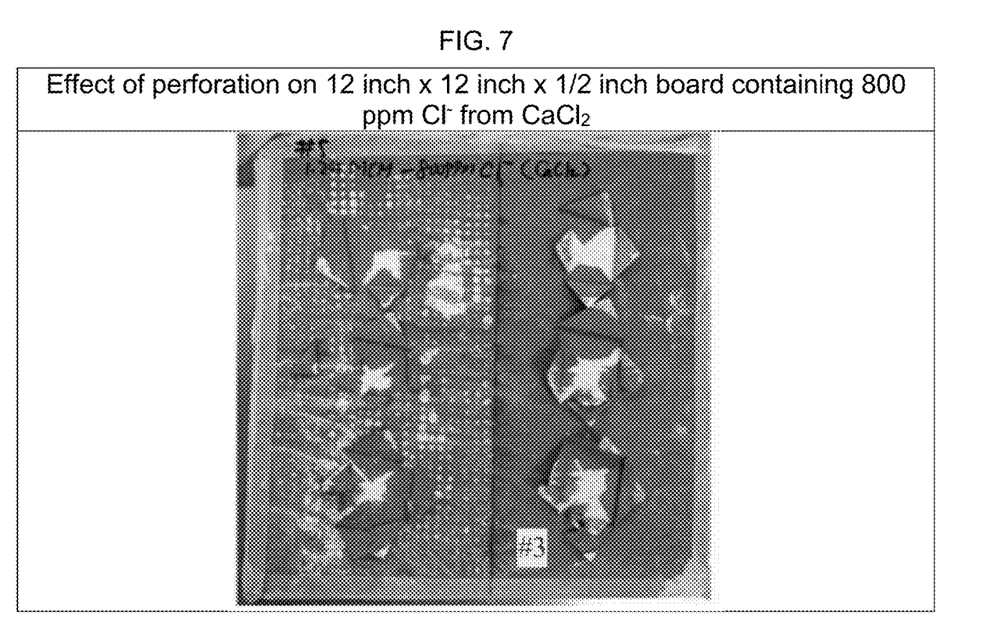

FIG. 7 shows the effect of perforation on 12 inch×12 inch×½ inch sample board #3 containing 800 ppm Cl⁻ from $CaCl_2$.

Figure 8:
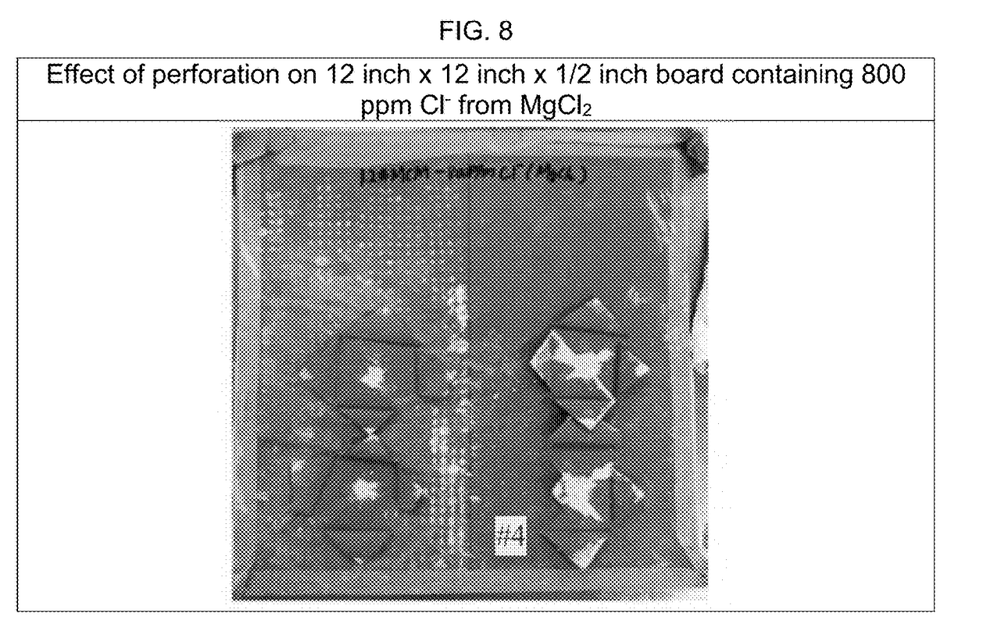

FIG. 8 shows the effect of perforation on 12 inch×12 inch×½ inch sample board #4 containing 800 ppm Cl⁻ from $MgCl_2$.

FIGS. 5-8 show for sample boards #1-#4 less paper separation occurred in the perforated section of the back cover sheet compared to the unperforated section. Less exposed gypsum was present in the perforated section due to having less paper separation. Thus, improved board core layer adhesion was realized in the perforated section of the back cover sheet at each concentration of all salts tested.

Figure 9:
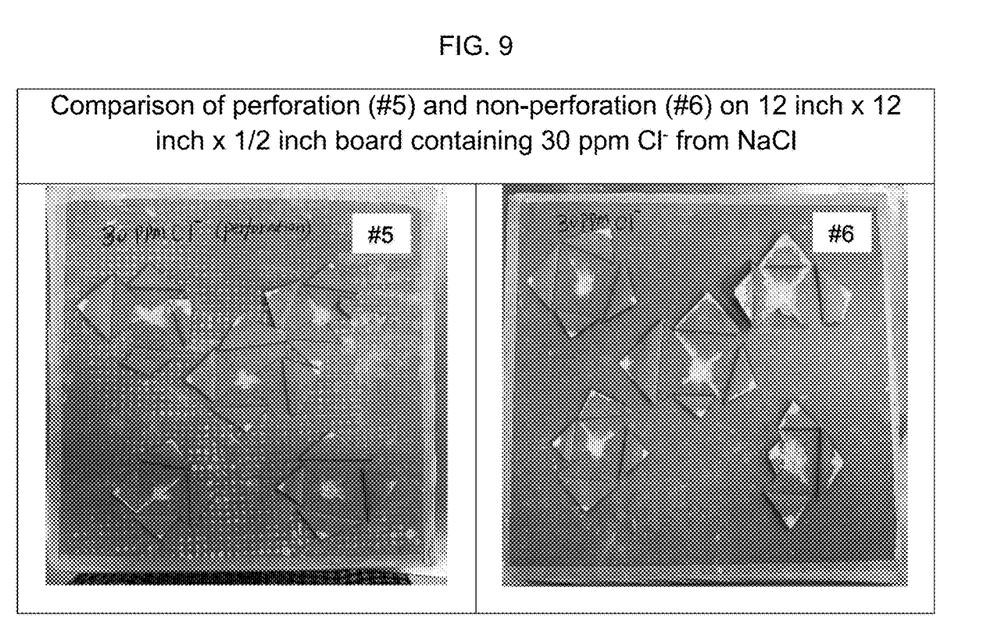
FIG. 9 shows photographs comparing a board of the present invention having a perforated cover sheet with a board having a non-perforated cover sheet to show the effect of perforation on 12 inch×12 inch×½ inch gypsum board containing 30 ppm $Cl^-$ from NaCl per million parts calcium sulfate hemihydrate.

FIG. 9 shows the effect of perforation and non-perforation on 12 inch×12 inch×½ inch board having a gypsum core made from stucco containing 30 ppm Cl⁻ from NaCl per million parts calcium sulfate hemihydrate. This stucco represents conventional low chloride salt stucco. FIG. 9 experimental sample board #5 used a cover sheet having perforations. FIG. 9 control sample board #6 used a cover sheet having no perforations.

Comparing FIG. 9 experimental sample board #5 and FIG. 9 Sample Board #6 shows when low chloride was used the perforations did not improve adhesion as much as for high chloride samples.

The preceding are merely examples of the invention. It will be understood by one of ordinary skill in the art that each of these examples may be used in various combinations with the other aspects of the invention provided herein.

Clauses of the Invention

The following clauses describe various aspects of the present invention:

Clause 1. A gypsum board comprising:
a board core layer comprising set gypsum;
a front paper cover sheet having an outer surface and an inner surface, the inner surface contacting a first face of the board core layer; and
a back paper cover sheet having an outer surface and an inner surface, the inner surface contacting a second face of the board core layer;
wherein the board core layer is disposed between the front paper cover sheet and the back paper cover sheet, and the back perforated paper cover sheet comprises a plurality of perforations extending therethrough; and
wherein the board core layer resulted from setting of an aqueous slurry comprising water and stucco between the first cover sheet and the second cover sheet, wherein the stucco comprises calcium sulfate hemihydrate, and the aqueous slurry comprises:
at least 60 weight percent of said calcium sulfate hemihydrate on a dry basis,
about 500 ppm to about 3000 ppm chloride anion per 1,000,000 parts by weight of said calcium sulfate hemihydrate, and
the water at a weight ratio of water to the calcium sulfate hemihydrate of 0.2:1 to 1.2:1.

Clause 2. The gypsum board of clause 1, wherein the front cover sheet is a front paper cover sheet and the back cover sheet is a back paper cover sheet.

Clause 3. The gypsum board of clause 1 or 2, wherein the plurality of perforations are arranged in a pattern.

Clause 4. The gypsum board of any preceding clause, wherein the plurality of perforations have a substantially circular shape.

Clause 5. The gypsum board of any preceding clause, wherein each perforation defines an opening ranging from about 0.005 inches to about 0.1 inches in size.

Clause 6. The gypsum board of any preceding clause, wherein each perforation defines an opening ranging from about 0.01 inches to about 0.02 inches in size.

Clause 7. The gypsum board of any preceding clause, wherein the back cover sheet has a perforation coverage density ranging from about 5 perforations/in² to about 50 perforations/in².

Clause 8. The gypsum board of any preceding clause, wherein the back cover sheet has a perforation coverage density ranging from about 12 perforations/in² to about 25 perforations/in².

Clause 9. The gypsum board of any preceding clause, wherein the board core layer comprises a low-density region and at least one high-density region, the at least one high-density region being interposed as a layer between the low-density region and the front cover sheet or the back cover sheet.

Clause 10. The gypsum board of clause 9, wherein the low-density region is sandwiched between a first high-density region disposed as a first layer contacting the front cover sheet and a second high-density region disposed as a second layer contacting the back cover sheet.

Clause 11. The gypsum board of clause 9 or 10, wherein the low-density region is formed from a foamed gypsum slurry and comprises a plurality of voids therein.

Clause 12. The gypsum board of any preceding clause, wherein the set gypsum is formed from synthetic gypsum comprising one or more chloride salts and said chloride salts provide at least a portion of said chloride anions.

Clause 13. The gypsum board of clause 12, wherein the aqueous slurry has about 1000 ppm to about 3000 ppm said chloride anion per 1,000,000 parts by weight of said calcium sulfate hemihydrate.

Clause 14. A method of making a gypsum board, comprising:
preparing an aqueous slurry comprising a mixture of water and stucco, wherein the stucco comprises calcium sulfate hemihydrate, and the aqueous slurry comprises a mixture of:
at least 60 weight percent of said calcium sulfate hemihydrate on a dry basis,
about 500 ppm to about 3000 ppm of chloride anion per 1,000,000 parts by weight of said calcium sulfate hemihydrate, and
the water at a weight ratio of water to the calcium sulfate hemihydrate of 0.2:1 to 1.2:1;
disposing the aqueous slurry between a front cover sheet and a back cover sheet, each cover sheet having an inner surface and an outer surface;
wherein the back cover sheet comprises a plurality of perforations extending therethrough, and the aqueous slurry contacts the inner surfaces of the front cover sheet and the back cover sheet;
setting the calcium sulfate hemihydrate to form a panel comprising a board core layer comprising calcium sulfate dihydrate;

drying the panel and cutting the panel into a gypsum board having one or more pre-determined dimensions.

Clause 15. The method of clause 14, further comprising: introducing the plurality of perforations to the back cover sheet with a wallboard perforating apparatus.

Clause 16. The method of clause 14 or 15, wherein the plurality of perforations are present in the back cover sheet before the back cover sheet contacts the aqueous slurry.

Clause 17. The method of clause 14 or 15, wherein the paper for the back paper cover sheet is fed from a roller with the plurality of perforations present in the back cover sheet before the back cover sheet contacts the aqueous slurry.

Clause 18. The method of any one of clauses 14-17, wherein at least a portion of the aqueous slurry is in a foamed state while being disposed between the front cover sheet and the back cover sheet.

Clause 19. The method of clause 18, wherein a first portion of the aqueous slurry is disposed in an unfoamed state as a first high-density region in layer form contacting the front cover sheet and a second portion of the aqueous slurry is disposed in a foamed state as a low-density region contacting the first high-density region.

Clause 20. The method of clause 19, wherein the low-density region is sandwiched between the first high-density region and a second high-density region in layer form contacting the back cover sheet.

Clause 21. The method of any one of clauses 14-20, wherein the calcium sulfate hemihydrate comprises synthetic gypsum comprising the one or more chloride salts.

Clause 22. A wall system comprising framing to which is attached at least one gypsum board of any of clauses 1-13, wherein the outer surface of the front cover sheet faces away from the framing.

Clause 23. The wall system of clause 22, wherein the gypsum board is on an interior wall or ceiling of a building.

Clause 24. The wall system of clause 22 or 23, wherein the framing is of wood.

Clause 25. The wall system of clause 22 or 23, wherein the framing is of metal.

Clause 26. The wall system of any one of clauses 22-25, wherein the at least one gypsum board is attached to the framing by any one or more of screws, nails, or glue.

Variations of the specifically disclosed invention may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

All references cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. "Bonding relation" does not mean that two layers are in direct contact. The terms "comprising," "having," "including," and "containing" are to be construed as open-ended terms (i.e., meaning "including, but not limited to,") unless otherwise noted. Recitation of ranges of values herein are intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

What is claimed is the following:

1. A flat gypsum board comprising: a board core layer comprising set gypsum; a front paper cover sheet having an outer surface and an inner surface, the inner surface contacting a first face of the board core layer, wherein the front paper cover sheet does not have a plurality of perforations; and a back paper cover sheet having an outer surface and an inner surface, the inner surface contacting a second face of the board core layer; wherein the board core layer is disposed between the front paper cover sheet and the back paper cover sheet, and the back paper cover sheet comprises a plurality of perforations extending therethrough; and wherein the board core layer resulted from setting of an aqueous slurry comprising water and stucco between the front paper cover sheet and the back paper cover sheet, wherein the stucco comprises calcium sulfate hemihydrate, and the aqueous slurry comprises: at least 60 weight percent said calcium sulfate hemihydrate on a dry basis, about 500 parts by weight to about 3000 parts by weight chloride anion per 1,000,000 parts by weight of said calcium sulfate hemihydrate, and the water at a weight ratio of water to the calcium sulfate hemihydrate of 0.2:1 to 1.2:1, wherein the back paper cover sheet has a perforation coverage density ranging from about 5 perforations/in$^2$ to about 50 perforations/in$^2$.

2. The gypsum board of claim 1, wherein the aqueous slurry comprises:
at least 90 weight percent said calcium sulfate hemihydrate on a dry basis,
wherein the aqueous slurry has about 500 parts by weight to about 2000 parts by weight said chloride anion per 1,000,000 parts by weight of said calcium sulfate hemihydrate,
wherein each perforation defines an opening ranging from about 0.01 inches to about 0.02 inches in size,
wherein the back paper cover sheet has a perforation coverage density ranging from about 12 perforations/in$^2$ to about 25 perforations/in$^2$.

3. The gypsum board of claim 1, wherein the plurality of perforations are arranged in a pattern.

4. The gypsum board of claim 1, wherein the plurality of perforations have a substantially circular shape.

5. The gypsum board of claim 1, wherein each perforation defines an opening ranging from about 0.005 inches to about 0.1 inches in size.

6. The gypsum board of claim 1, wherein each perforation defines an opening ranging from about 0.01 inches to about 0.02 inches in size.

7. The gypsum board of claim 1, wherein the back paper cover sheet has a perforation coverage density ranging from about 12 perforations/in$^2$ to about 25 perforations/in$^2$.

8. The gypsum board of claim 1, wherein the board core layer comprises a low-density region and at least one high-density region, the at least one high-density region being interposed as a layer between the low-density region and the front paper cover sheet.

9. The gypsum board of claim 8, wherein the low-density region is sandwiched between a first high-density region disposed as a first layer contacting the front paper cover sheet and a second high-density region disposed as a second layer contacting the back paper cover sheet.

10. The gypsum board of claim 9, wherein the low-density region comprises a plurality of voids therein.

11. The gypsum board of claim 1, wherein the set gypsum is formed from synthetic gypsum comprising one or more chloride salts and said chloride salts provide at least a portion of said chloride anions.

12. The gypsum board of claim 11, wherein the aqueous slurry has about 1000 parts by weight to about 3000 parts by weight said chloride anion per 1,000,000 parts by weight of said calcium sulfate hemihydrate.

13. A method of making a flat gypsum board of claim 1, comprising: preparing an aqueous slurry comprising a mixture of water and stucco, wherein the stucco comprises calcium sulfate hemihydrate and the aqueous slurry comprises a mixture of: at least 60 weight percent of said calcium sulfate hemihydrate on a dry basis, about 500 parts by weight to about 3000 parts by weight chloride anion per 1,000,000 parts by weight of said calcium sulfate hemihydrate, and the water at a weight ratio of water to the calcium sulfate hemihydrate of 0.2:1 to 1.2:1;

disposing the aqueous slurry between a front paper cover sheet and a back paper cover sheet, each paper cover sheet having an inner surface and an outer surface;

wherein the back paper cover sheet comprises a plurality of perforations extending therethrough, and the aqueous slurry contacts the inner surfaces of the front paper cover sheet and the back paper cover sheet, wherein the back paper cover sheet has a perforation coverage density ranging from about 5 perforations/in$^2$ to about 50 perforations/in$^2$; setting the calcium sulfate hemihydrate to form a panel comprising a board core layer comprising calcium sulfate dihydrate; drying the panel and cutting the panel into a gypsum board having one or more pre-determined dimensions.

14. The method of claim 13, further comprising: introducing the plurality of perforations to the back paper cover sheet with a wallboard perforating apparatus.

15. The method of claim 13, wherein the plurality of perforations are present in the back paper cover sheet before the back paper cover sheet contacts the aqueous slurry.

16. The method of claim 13, wherein the paper for the back paper cover sheet is fed from a roller with the plurality of perforations present in the back paper cover sheet before the back paper cover sheet contacts the aqueous slurry.

17. A wall system comprising wall framing to which is attached at least one gypsum board of claim 1, wherein the back paper cover sheet contacts the wall framing and the outer surface of the front paper cover sheet faces away from the framing.

18. The gypsum board of claim 1, wherein the back paper cover sheet consists of paper.

19. The gypsum board of claim 1, wherein the aqueous slurry further comprises siloxane for water resistance in an amount of 0.5 to 10% by weight of the stucco.

* * * * *